US008611930B2

(12) United States Patent
Louboutin et al.

(10) Patent No.: US 8,611,930 B2
(45) Date of Patent: Dec. 17, 2013

(54) SELECTING INFORMATIVE PRESENTATIONS BASED ON NAVIGATION CUES AND USER INTENT

(75) Inventors: Sylvain Louboutin, Sunnyvale, CA (US); Gregg Golembeski, Jr., San Francisco, CA (US); Daniel de Rocha Rosario, San Francisco, CA (US); Robert J. Walsh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/467,469

(22) Filed: May 9, 2012

(65) Prior Publication Data

US 2013/0303192 A1 Nov. 14, 2013

(51) Int. Cl.
| | |
|---|---|
| H04W 24/00 | (2009.01) |
| H04L 29/06 | (2006.01) |
| H04M 1/00 | (2006.01) |
| H04B 1/38 | (2006.01) |
| H04B 1/034 | (2006.01) |
| G06F 19/00 | (2011.01) |
| G06Q 30/00 | (2012.01) |

(52) U.S. Cl.
USPC .......... 455/456.3; 455/414.3; 455/550.1; 455/557; 455/99; 701/32.4; 701/412; 701/541; 705/14.49

(58) Field of Classification Search
USPC ............ 455/456.1–457, 404.1–404.2, 455/414.1–414.3, 99, 550.1, 557; 705/14.36, 14.39, 14.4, 14.49; 701/32.4, 412, 541
See application file for complete search history.

(56) References Cited

U.S. PATENT DOCUMENTS

| | | | |
|---|---|---|---|
| 7,933,895 B2 | 4/2011 | Amjadi | |
| 8,095,303 B1* | 1/2012 | Nesbitt et al. | 701/426 |
| 2001/0049636 A1 | 12/2001 | Hudda et al. | |
| 2005/0233697 A1* | 10/2005 | Yu | 455/41.3 |
| 2007/0174116 A1* | 7/2007 | Keith et al. | 705/14 |
| 2008/0109285 A1 | 5/2008 | Reuther et al. | |
| 2008/0319653 A1* | 12/2008 | Moshfeghi | 701/208 |
| 2009/0171779 A1* | 7/2009 | Shrivathsan et al. | 705/14 |
| 2010/0070334 A1 | 3/2010 | Monteverde | |
| 2010/0332315 A1* | 12/2010 | Kamar et al. | 705/14.46 |
| 2011/0144908 A1 | 6/2011 | Cheong | |
| 2012/0092326 A1* | 4/2012 | Borak et al. | 345/419 |
| 2012/0290150 A1* | 11/2012 | Doughty et al. | 701/2 |

* cited by examiner

*Primary Examiner* — Vladimir Magloire
*Assistant Examiner* — Michael Mapa
(74) *Attorney, Agent, or Firm* — Kilpatrick Townsend & Stockton LLP

(57) ABSTRACT

Promotional or informational materials are selected for presentation to mobile device users based at least in part on knowledge about where those users intend to go. If a user performs a points-of-interest search that evinces a particular intent, then the mobile device can select informational materials that are associated with that particular intent, and then display those informational materials. The informational materials selected can be limited to those that are mapped to a point of interest that the searching user selected from a list of points of interest that are relevant to the user's specified intent. Additionally or alternatively, the mobile device might display only the informational materials that are mapped to a particular point of interest in response to detecting that the user has entered within a specified proximity of that particular point of interest, as determined through a global positioning system of the user's mobile device.

10 Claims, 4 Drawing Sheets

SELECTING INFORMATIVE PRESENTATIONS BASED ON NAVIGATION CUES AND USER INTENT

BACKGROUND

The present disclosure relates generally to the presentation of information, such as advertising, and in particular to selecting informative presentations based on navigation cues and user intent.

Mobile devices, such as smart phones, often come equipped with global positioning systems (GPS) which allow the mobile device to ascertain the user's geographical location at any particular time. Applications that execute on mobile devices so equipped have come to take advantage of this positional information. For example, a mapping application that executes on a mobile device might receive a user's command to plot a route from the user's current location to a user-specified destination. In response to such a command, the mapping application can use the global positioning data to determine the shortest or best route from the user's current location to the user-specified destination.

Some advertisers have also sought to take advantage of the global positioning systems of mobile devices. One popular use of GPS is known as "geofencing." Geofencing involves the definition of a geographical area, typically via a set of coordinates that define a polygonal boundary or the center of a circular area. Applications that execute on a mobile device can continuously monitor the location of the mobile device. In response to an application's determination that the mobile device's current GPS coordinates fall within the boundaries of such a "geofenced" area, the application can present, to the mobile device's user, an advertisement that is associated with a point of interest found in that area. The advertiser hopes that it has guessed correctly that the user's current proximity to a point of interest signifies that the user would be interested in the contents of the advertisement. Unfortunately, too often, the user's current proximity to any point of interest is merely coincidental, and has nothing to do with the user's intent. Under such circumstances, the user might find the advertisement to be irrelevant, annoying, or intrusive.

SUMMARY

Certain embodiments of the present invention can generate a list of points of interest on a mobile device (e.g., a smart phone, a laptop computer, a tablet computer, or any other portable device) in response to a request, by the user of that device, to locate such points of interest that are related to a user-specified intent. At least some of the entries in the list can specify both a point of interest and a field that indicates whether any additional information (e.g., coupons or other promotional materials) pertaining to that point of interest are available. For example, the field can contain a description of an available promotion if such a promotion is available. Such a field can be implemented as an extended type field in cases where each list entry is implemented as a separate vCard. When the list is presented to the user, either by the mobile device itself or by some accessory with which the mobile device communicates, the list can display available information (e.g., promotional materials) for various points of interest in the list, potentially motivating the user to select one point of interest over other points of interest in the list. Notably, the points of interest are not necessarily those at which the user is currently located (though they can be selected based at least in part due to their proximity to the user's current location), but are those that are related to the intent that the user has manifested through his request. Although the discussion below refers to promotional materials, it should be understood that embodiments of the invention also can include enhanced data in addition to or instead of promotional materials.

Certain embodiments of the present invention can provide such a promotional material-enhanced list from a mobile device to an accessory that communicates with the mobile device. Through such an accessory (e.g., a car's speakerphone), the user can interact with an intelligent assistant executing on the mobile device. For example, the user can speak a request into an accessory microphone (e.g., a car's speakerphone system) that can send the audio to the mobile device for processing. In response, the intelligent assistant's output (e.g., a list of vCards) can be presented directly on the mobile device or sent to the accessory, which can present the output on its own screen. A user of the accessory can use the accessory to select a particular list entry from the list. In response to the user's selection, the accessory can indicate, to the mobile device, the identity of the particular list entry that the user selected. Additionally or alternatively, the accessory can act on the selection locally by presenting, to the user, one or more promotional materials (e.g., coupons) or other information items that are associated with the particular list entry via the field discussed above. Additionally or alternatively, in response to receiving the identity of the particular list entry from the accessory, the mobile device can present, to the user of the mobile device, one or more promotional materials (e.g., coupons) or other information items that are associated with the particular list entry via the field discussed above. The communication path between the mobile device and the accessory creates at least one point in which promotional material such as advertisements can be inserted into the information being communicated via the path. For example, a protocol layer that sends a list of vCards to the accessory can add the promotional material to those vCards, or the accessory itself can add the promotional material to those vCards.

Certain embodiments of the present invention involve a mobile device receiving user intent data. For example, the mobile device can receive (e.g., wirelessly) the user intent data from an accessory that is separate from the mobile device. Based at least in part on the user intent data, the mobile device can generate a list containing multiple entries. Each of the entries has an associated location. The mobile device can augment one or more of the entries with additional content that is selected based at least in part on those entries' associated locations and based at least in part on the user intent data. For example, the additional content can include advertisements. The mobile device can send (e.g., wirelessly) the list, including the augmented entries, to an accessory that is capable of presenting the list, with the additional content, to the user.

Certain embodiments of the present invention involve a mobile device receiving (e.g., wirelessly), from an accessory that is separate from the mobile device, information that identifies a location selected by a user. For example, the information can identify a location that is associated with one of the entries discussed above. The mobile device also identifies additional content to be presented to the user. The mobile device performs this identification based at least in part on the user-selected location. The mobile device additionally can perform this identification based at least in part on user intent data that the mobile device receives from the accessory. The mobile device sends (e.g., wirelessly) the additional content to the accessory, which is capable of presenting the additional content to the user. The additional content can include an advertisement.

Certain embodiments of the present invention involve the mobile device additionally providing, to the user of the mobile device, promotional materials that are not necessarily associated with the identity of the particular list entry that the user selected, but that are associated with other points of interest that are within the vicinity of the point of interest specified within the particular list entry that the user selected. For example, the mobile device can display both (a) promotional materials that are associated with the particular point of interest specified in the user-selected list entry as well as (b) promotional materials that are associated with points of interest that are within a specified quantity of units of distance from the particular point of interest. For example, the mobile device can display both (a) promotional materials that are associated with the particular point of interest specified in the user-selected list entry as well as (b) promotional materials that are associated with points of interest that are within a same political entity (e.g., city, state, county, nation, etc.) or within a same geographical area (e.g., street, block, park, etc.) as the one in which the particular point of interest is located, regardless of distance.

Certain embodiments of the present invention involve the mobile device continuously monitoring its own location (e.g., via a global positioning system) and detecting that it has arrived at a destination that is specified by the user-selected point of interest. In response to detecting arrival at the destination, the mobile device can present a notification to the user (e.g., in the form of a banner that temporarily pops up on the display of the mobile device). The notification can be user-selectable. In response to the user's selection of the notification, the mobile device can invoke an application, such as a web browser, that displays promotional materials that are associated with the point of interest at which the mobile device has arrived.

The following detailed description together with the accompanying drawings will provide a better understanding of the nature and advantages of the present invention.

BRIEF DESCRIPTION

DETAILED DESCRIPTION

Figure 1:
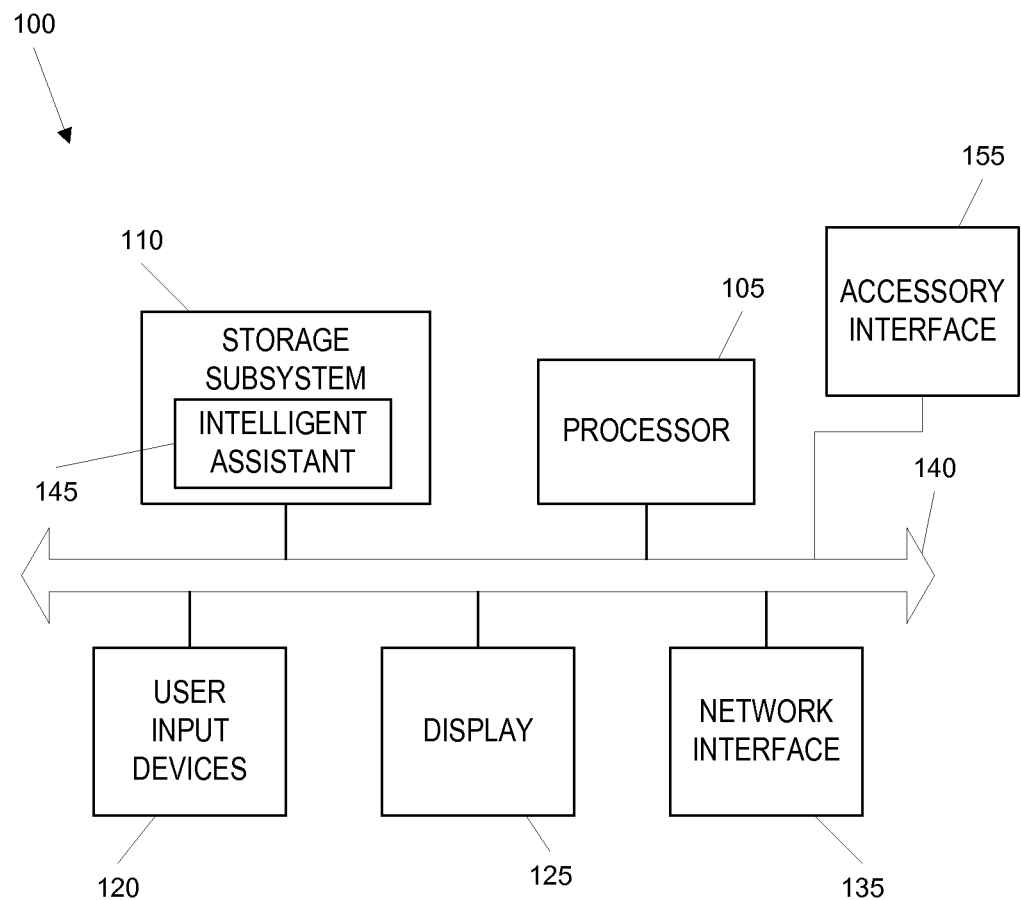
FIG. 1 is a block diagram of a computer system according to an embodiment of the present invention.

The discussion below refers to a mobile device performing various operations. However, in various alternative embodiments of the present invention, such operations can be performed by the mobile device acting in cooperation with a server that is remote from the mobile device. Such a server may receive information from the mobile device, perform processing based on that information, and then return further information and/or instructions to the mobile device for further action. Thus, discussions below of data being generated by the mobile device can be read to include such data being generated by a server and/or the mobile device together.

Certain embodiments of the present invention relate to providing, to mobile device users, advertisements and/or other promotional or informational materials that are selected for presentation to those users based at least in part on knowledge about where the user intends to go. If the user performs a points-of-interest search that evinces a particular intent, then the mobile device can select promotional or informational materials that are associated with that particular intent, and then display those promotional or informational materials. In some embodiments, the promotional or informational materials selected are only those that are mapped to a point of interest that the searching user selected from a list of points of interest that are relevant to the user's specified intent. In some embodiments, the mobile device only displays the promotional or informational materials that are mapped to a particular point of interest in response to detecting that the user has entered within a specified proximity of that particular point of interest, as determined through a global positioning system of the user's mobile device.

For example, a user of a mobile device might issue vocal commands to a software-based intelligent assistant executing on that mobile device. These vocal commands can be received directly by the mobile device or through an input of an accessory that is separate from the mobile device; in the latter case, the accessory can communicate the vocal commands to the mobile device via a communication path. The user might ask the agent to find nearby points-of-interest related to a particular intent specified by the user (e.g., coffee shops). The mobile device can send, to the accessory, a list of nearby points of interest that are relevant to the specified intent. The accessory can display this list to a user. In addition to determining a list of nearby points of interest that are relevant to the specified intent, the mobile device can determine a set of other points of interest that are both (a) within a specified distance of a point of interest that is related to the specified intent and (b) mapped to promotional material. The mobile device can filter the set of other points of interest to exclude those that are mapped to promotional materials that are not relevant to the specified intent. The mobile device can send this set of other points of interest to the accessory. The accessory can then display a map that shows the user's current location, along with the locations of nearby points of interest that are relevant to the specified intent. The map additionally can indicate the locations of the other nearby points of interest to which promotional materials are mapped. The display of these other nearby points of interest to which promotional materials are mapped can entice the user to go out of his way in order to visit a nearby point of interest that is currently offering a promotion in which the user is interested. In addition to or instead of presenting an advertisement or coupon as an item of promotional material, the mobile device can recommend non-advertisement tourist attractions and/or non-advertisement interesting landmarks that are within a specified distance of the point of interest that is related to the specified intent. The mobile device can filter these attractions and landmarks based on whether they are relevant to the specified intent.

For another example, a user of a mobile device might issue vocal commands to a software-based intelligent assistant executing on that mobile device. These vocal commands can be received directly by the mobile device or through an input of an accessory that is separate from the mobile device; in the latter case, the accessory can communicate the vocal commands to the mobile device via a communication path. The user might ask the agent to find nearby points-of-interest related to a particular intent specified by the user (e.g., coffee shops). The mobile device can send, to the accessory, a list of nearby points of interest that are relevant to the specified intent. The accessory can display this list to a user. After the accessory displays the list of nearby points of interest that are relevant to the specified intent, the mobile device can receive (directly or from the accessory) a command from the user instructing the mobile device to determine a route from the user's current location to a selected particular point of interest from the list. In response to such a command, the mobile device can automatically determine a shortest or best route to the particular point of interest. The mobile device can also determine a set of other points of interest that are both (a) within a specified distance of the route to the particular point of interest and (b) mapped to promotional material. The mobile device can filter the set of other points of interest to exclude those that are mapped to promotional materials that are not relevant to the specified intent. The mobile device can send this information to the accessory. The accessory can then display a map that shows the user's current location, along with the route to the particular point of interest. The map additionally can indicate the locations of the other nearby points of interest to which promotional materials are mapped. In addition to or instead of presenting an advertisement or coupon as an item of promotional material, the mobile device can recommend non-advertisement tourist attractions and/or non-advertisement interesting landmarks that are within a specified distance of the route. The mobile device can filter these attractions and landmarks based on whether they are relevant to the specified intent.

In certain embodiments of the invention, the mobile device can store reminders that the user has caused the mobile device to generate. Each such reminder can be associated with a task, typically expressed as a string of text, and a date and/or time by which the task ought to be performed or at which the user has instructed the mobile device to remind the user of the task. Each task in the reminder list is also an indication of user intent. The mobile device can select promotional materials that are mapped to the intents reflected by the tasks in the reminder list, and then display those promotional materials to the user. In certain embodiments of the invention, the mobile device can ascertain user intent from user-specific data maintained by various different applications that are also resident on the mobile device.

FIG. 1 illustrates a computer system 100 according to an embodiment of the present invention. Computer system 100 can be implemented as any of various computing devices, including, e.g., a desktop or laptop computer, tablet computer, smart phone, personal data assistant (PDA), or any other type of computing device, not limited to any particular form factor.

Computer system 100 can include processing unit(s) 105, storage subsystem 110, input devices 120, display 125, network interface 135, and bus 140.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of electronic device 100. The permanent storage device can be a read-and-write memory device. This permanent storage device can be a non-volatile memory unit that stores instructions and data even when computer system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105, such as an intelligent assistant 145. "Software" refers generally to sequences of instructions that, when executed by processing unit(s) 105 cause computer system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by electronic device 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touch-screen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for electronic device 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Electronic device 100 can also communicate with various accessories to enhance user interaction with electronic device 100. For example, electronic device 100 can be connected to an accessory that has a larger display or more powerful speakers, or a more convenient user interface, than electronic device 100 has. Such accessories can be used to present and interact with media content and other information stored on electronic device 100. Accessory interface 155 enables communication between electronic device 100 and such accessories. Accessory interface 155 can include a connector, antenna, or other hardware components capable of sending and receiving information-carrying signals via wired and/or wireless communication paths. The signals and the information can be formatted to comply with an accessory protocol that is defined for use by accessories that interoperate with electronic device 100. This protocol, which can be proprietary to the manufacturer of device 100, can allow accessories to invoke functionality of electronic device 100 (such as an intelligent assistant).

Accessory interface 155 can implement the communication path between a mobile device and an accessory as discussed elsewhere herein.

Bus 140 can include various system, peripheral, and chipset buses that communicatively connect the numerous internal devices of electronic device 100. For example, bus 140 can communicatively couple processing unit(s) 105 with storage subsystem 110. Bus 140 also connects to input devices 120 and display 125. Bus 140 also couples electronic device 100 to a network through network interface 135. In this manner, electronic device 100 can be a part of a network of multiple computer systems (e.g., a local area network (LAN), a wide area network (WAN), an Intranet, or a network of networks, such as the Internet. Bus 140 further enables communication between electronic device 100 and an accessory via accessory interface 155. Any or all components of electronic device 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit (s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for electronic device 100. For example, processing unit(s) 105 can execute intelligent assistant 145. In some embodiments, intelligent assistant 145 is a software-based process that can process digital audio using voice recognition. Through this processing, intelligent assistant 145 can transform the digital audio into a query. Depending on the content and context of the query, intelligent assistant 145 can select an action to be performed from a set of possible actions. For example, the set of possible actions may include running a web search, creating an appointment, playing music, making a telephone call, etc. After selecting the action to be performed, intelligent assistant 145 can perform that action. At least some of the functionalist of intelligent assistant 145 can be implemented on servers that are located remotely from electronic device 100. Intelligent assistant 145 may interact with those servers via network interface 135. Intelligent assistant 145 might perform only a part of the work involved in the performance of the selected action. For example, intelligent agent 145 can forward the query to a server, receive instructions from the server in reply, and then locally perform, on electronic device 100, any operations indicated within those instructions.

It will be appreciated that computer system 100 is illustrative and that variations and modifications are possible. Computer system 100 can have other capabilities not specifically described here (e.g., mobile phone, global positioning system (GPS), power management, one or more cameras, various connection ports for connecting external devices or accessories, etc.). Further, while computer system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 2:
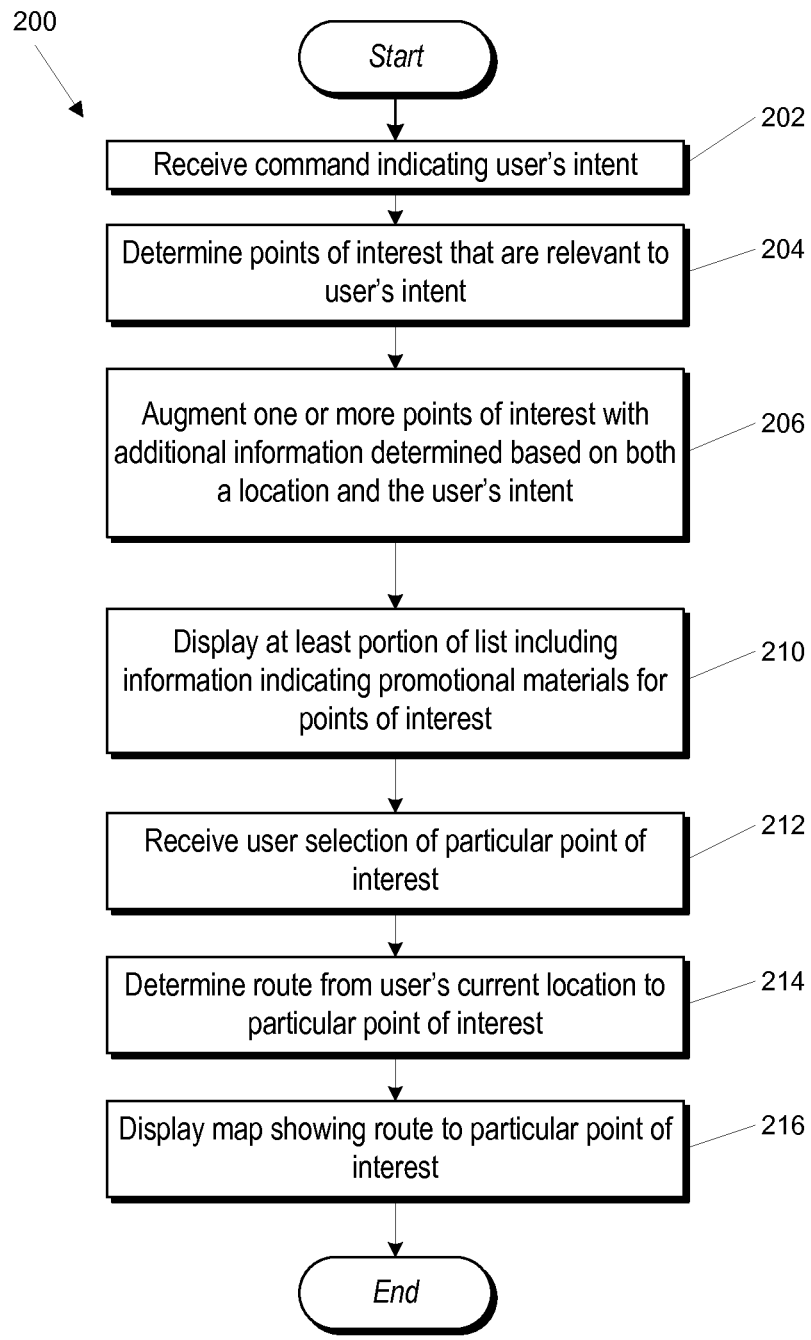
FIG. 2 is a flow diagram of a process for presenting promotional materials to a mobile device user based on the user's intended destination, according to an embodiment of the present invention.

In one embodiment of the invention, additional points of interest can be inserted into an initial list of points of interest deemed relevant to the user's intent. Each list entry pertaining to such an additional point of interest can indicate information about the promotional or informational material pertaining to that additional point of interest. FIG. 2 is a flow diagram of a process 200 for presenting promotional materials in a list of points of interest based on a mobile device user's intent, according to an embodiment of the present invention. In block 202, the mobile device can receive a command that indicates the user's intent. For example, the mobile device can receive a command asking for a list of stores of a particular type. Instead of receiving the command directly, in one embodiment of the invention, the mobile device receives the command from a separate accessory that forwards that command to the mobile device via a communication path. In block 204, the mobile device can determine a set of points of interest that are relevant to the user's intent. For example, if the user's intent is to find a coffee shop, then the mobile device can select, from a set of known coffee shops, a set of coffee shops that are within a specified distance of the user's current location.

In block 206, the mobile device can augment at least one of the points of interest determined in block 204 with additional information (e.g., promotional or informational materials such as advertisements, coupons, etc.) determined based on a location (e.g., the user's current location and/or a destination specified by the user) and the user intent. The mobile device can sort the augmented list of points of interest based at least in part on the distances of those points of interest from the user's current location, such that the points of interest nearest to the user's current location will appear toward the top of the list. If the initial list takes the form of a list of vCards, then the augmentation can involve the population of extended fields of one or more of those vCards with the additional information.

In block 210, the mobile device can display at least a portion of the list to the user. Alternatively, the mobile device can send the list to a separate accessory via a communication path, and the accessory can display at least a portion of the list to the user. For example, the mobile device can display a specified quantity of list entries that are ranked the highest (e.g., based at least in part on distance) among entries in the list. List entries that are mapped to promotional material can display, along with information identifying that entry's point of interest, information relating to the promotional material mapped to that point of interest. Such information can take the form of a textual advertisement, for example. Alternatively, such information can take the form of a URL that refers to a web page that contains the promotional material (e.g., an advertisement, coupon, etc.). In response to the user's selection of such a URL, the mobile device can invoke a browser application and send an HTTP request to a server requesting the web page to which the URL refers. The browser application can display the promotional material on the web page in response to receiving an HTTP reply from the server.

In block 212, the mobile device can receive, from the user, a selection of a particular point of interest from the list of points of interest. For example, the mobile device can detect that a user has touched, on a touch-sensitive screen of the mobile device, a region on which a particular list entry, corresponding to the particular point of interest, is displayed. Alternatively, the accessory can detect a user selection of a point of interest on its own touch-sensitive screen, and forward information indicating this selection to the mobile device. In block 214, the mobile device can determine a route from the user's current location to the particular point of interest.

In block 216, the mobile device can display, to the user, a map that shows at least the user's current location and the route from the user's current location to the selected particular point of interest. Alternatively, the mobile device can send the map to the accessory via a communication path. The accessory can then display the map to the user.

In certain embodiments of the invention, the corpus of points of interest is stored within a database on a server that is remote to the mobile device and with which the mobile device communicates wirelessly. In certain embodiments of the invention, in order to ensure that promotional materials associated with points of interest are fresh, the mobile device queries this database anew in response to each user request. The promotional materials associated with points of interest in the database can be time-limited, so that some promotional materials can expire and other promotional materials can be introduced over time. Within the database, each mapping between a point of interest and promotional material can additionally indicate a range of dates and/or times for which the promotional material is valid; as promotional materials expire, they can be removed from the database automatically. Thus, in certain embodiments of the invention, fresh promotional materials are ascertained in between the time that the mobile device receives the user's request and the time that the mobile device generates the list of points of interest for display to the user.

Figure 3:
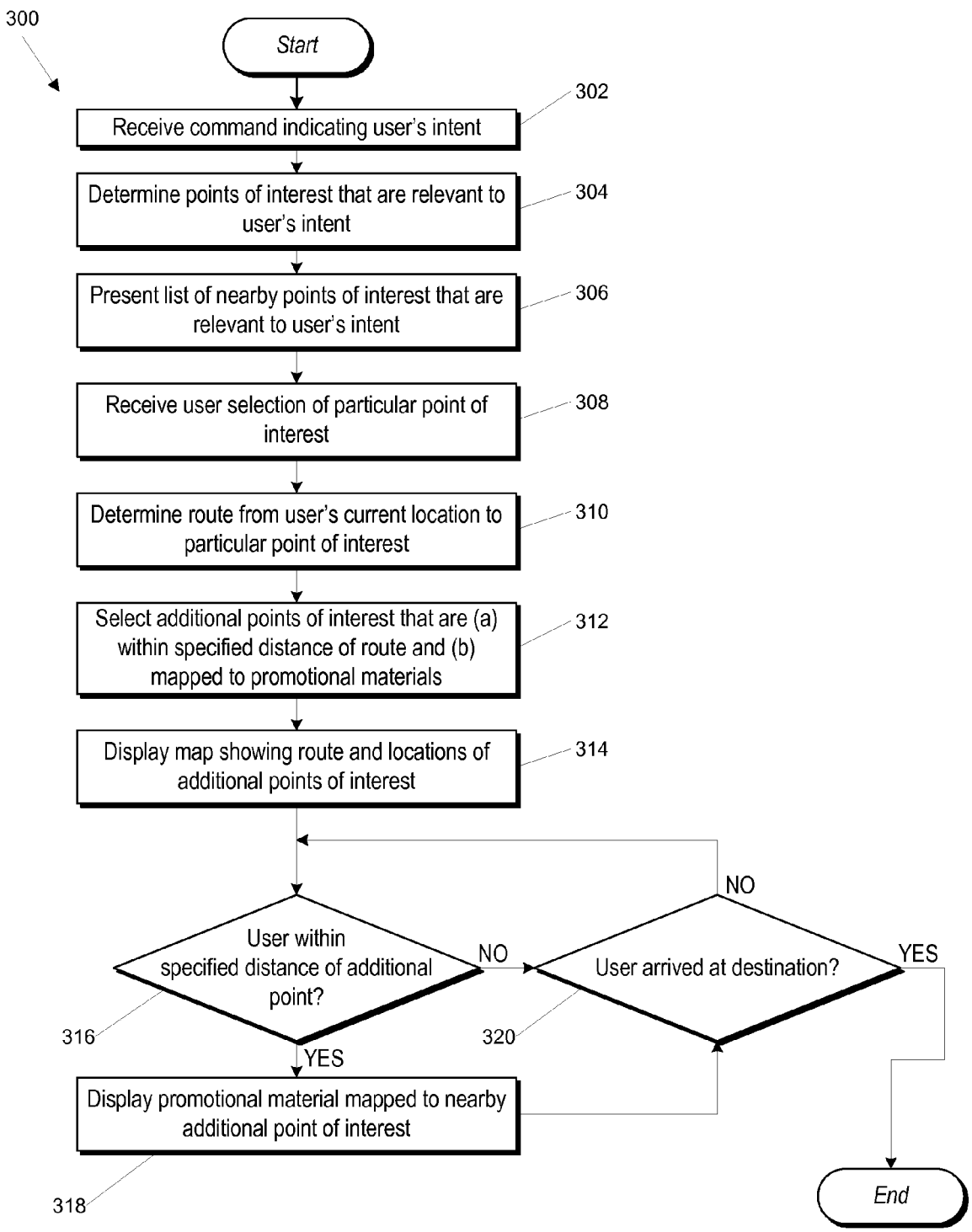
FIG. 3 is a flow diagram of a process for presenting promotional materials in a list of points of interest based on the user's intent, according to an embodiment of the present invention.

FIG. 3 is a flow diagram of a process 300 for presenting promotional materials to a mobile device user based on the user's intended destination, according to an embodiment of the present invention. In block 302, the mobile device can receive a command that indicates the user's intent. For example, the mobile device can receive a command asking for a list of stores of a particular type. In block 304, the mobile device can determine a set of points of interest that are relevant to the user's intent. For example, if the user's intent is to find a coffee shop, then the mobile device can select, from a set of known coffee shops, a set of coffee shops that are within a specified distance of the user's current location. The mobile device can sort the set of points of interest based at least in part on the distances of those points of interest from the user's current location, such that the points of interest nearest to the user's current location will appear toward the top of the list.

In block 306, the mobile device can present, to the user, the list of selected nearby points of interest that are relevant to the user's specified intent. Although in one embodiment the mobile device presents the list, in an alternative embodiment, the mobile device sends the list via a communication path to an accessory that is separate from the mobile device. In block 308, the mobile device can receive, from the user, a selection of a particular point of interest from the list of points of interest. For example, the mobile device can detect that a user has touched, on a touch-sensitive screen of the mobile device, a region on which a particular list entry, corresponding to the particular point of interest, is displayed. Although in one embodiment of the invention the mobile device receives the selection directly, in an alternative embodiment, the accessory receives the selection and communicates the selection to the mobile device via a communication path. In block 310, the mobile device can determine a route from the user's current location to the particular point of interest. In block 312, the mobile device can select, from a corpus of other points of interest, a set of additional points of interest that are both (a) within a specified distance of the route and (b) mapped to promotional or informative materials (e.g., advertisements, coupons, etc.). In one embodiment of the invention, each point of interest is stored as a vCard (a data structure), and an extended field of the vCard contains text related to the promotional or informative material mapped to that point of interest. For example, such text might take the form of a uniform resource locator (URL) that refers to a web page on which the promotional material relevant to the vCard's point of interest is contained. In some embodiments of the invention, the mobile device filters the selected points of interest to exclude points of interest that are mapped to promotional or informative materials that are not relevant to the user's intent.

In block 314, the mobile device can display, to the user, a map that shows the user's current location, the route to the selected particular point of interest, and the locations of the additional points of interest. Alternatively, the mobile device can send the map to the accessory via a communications path, and the accessory can display the map. The map also can display, for each additional point of interest, some information regarding the promotional material that is mapped to that additional point of interest. This information can be presented on the map as initially displayed to the user, for all additional points of interest shown on the map, or such information just for a single such additional point of interest can be shown specifically in response to the user selecting (e.g., via touch) that additional point of interest on the map. Such information can entice the user to visit one or more of the additional points of interest prior to (or instead of) going to the destination at the end of the route.

In block 316, the mobile device can determine whether the user has come within a specified distance of any of the additional points of interest. If the user has come within the specified distance of the additional points of interest, then control passes to block 318. Otherwise, control passes to block 320.

In block 318, the mobile device can display the promotional material that is mapped to the additional point of interest to which the user has come near. Such promotional material can take the form of a coupon that is redeemable at the additional point of interest to which the user has come near, for example. Alternatively, the mobile device can send the promotional material to the accessory, which can display the promotional material. After further potential interaction between the user and the mobile device, control passes to block 320.

In block 320, the mobile device can determine whether the user has arrived at the destination at the end of the route. If the user has arrived at the destination at the end of the route, then process 300 ends. Otherwise, control passes back to block 316.

Figure 4:
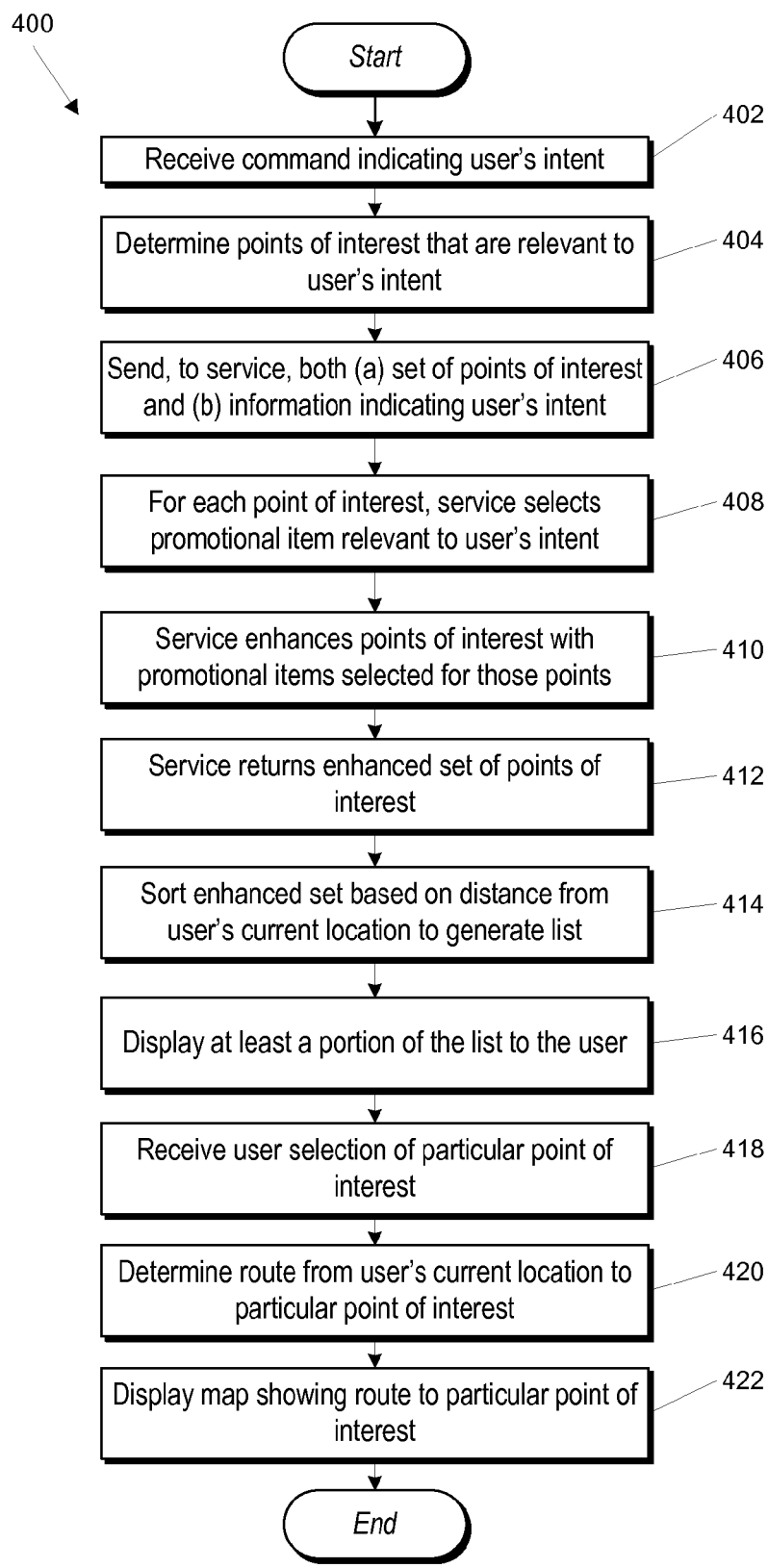
FIG. 4 is a flow diagram of a process for decorating data with promotional materials based at least in part on user intent, according to an embodiment of the present invention.

In certain embodiments of the invention, after a mobile device generates a set of data based at least in part on received user input that indicates user intent, the mobile device sends that data to a specialized service (which might or might not reside on the mobile device) to be "decorated" with promotional materials based on the user intent. FIG. 4 is a flow diagram of a process 400 for decorating data with promotional materials based at least in part on user intent, according to an embodiment of the present invention. In block 402, the mobile device can receive a command that indicates the user's intent. For example, the mobile device can receive a command asking for a list of stores of a particular type. In an alternative embodiment of the invention, an accessory separate from the mobile device receives the command and forwards the command to the mobile device via a communication path. In block 404, the mobile device can determine a set of points of interest that are relevant to the user's intent. For example, if the user's intent is to find a coffee shop, then the mobile device can select, from a set of known coffee shops, a set of coffee shops that are within a specified distance of the user's current location.

In block 406, the mobile device can send, to a specialized service, both (a) the set of points of interest and (b) information indicating the user's intent. In block 408, for each of one or more of the points of interest in the set of points of interest, the specialized service can select, from a corpus of promotional materials, a promotional item that is (a) relevant to the user's intent and (b) associated with that point of interest. In block 410, the specialized service can enhance or "decorate" the one or more of the points of interest with the promotional items selected for those points of interest. For example, the enhancement can be the addition of a textual advertisement to a vCard representing a point of interest. For another example, the enhancement can be the addition of a URL to such a vCard, in which the URL refers to a web page that contains promotional material associate with the point of interest. In block 412, the specialized service can return the enhanced set of points of interest to the mobile device. The specialized service can reside on the mobile device, or within the accessory, or somewhere else (e.g., on a remote Internet-accessible server).

In block 414, the mobile device can sort the enhanced set of points of interest based at least in part on the distances of those points of interest from the user's current location, thereby generating an enhanced list of points of interest. In block 416, the mobile device can display at least a portion of the enhanced list to the user, or alternatively, the mobile device can send the enhanced list to the accessory via a communication path, and the accessory can display at least a portion of the enhanced list to the user. For example, the mobile device can display a specified quantity of list entries that are ranked the highest among entries in the list. List entries that are enhanced with promotional material can display, along with information identifying that entry's point of interest, information relating to the promotional material mapped to that point of interest. Such information can take the form of a textual advertisement, for example.

Alternatively, such information can take the form of a URL that refers to a web page that contains the promotional material (e.g., an advertisement, coupon, etc.). In response to the user's selection of such a URL, the mobile device can invoke a browser application and send an HTTP request to a server requesting the web page to which the URL refers. The browser application can display the promotional material on the web page in response to receiving an HTTP reply from the server.

In block 418, the mobile device can receive, from the user, a selection of a particular point of interest from the list of points of interest. Alternatively, the accessory can receive the user selection and forward, to the mobile device via a communication path, information identifying the user selection. For example, the mobile device or accessory can detect that a user has touched, on a touch-sensitive screen of the mobile device, a region on which a particular list entry, corresponding to the particular point of interest, is displayed. In block 420, the mobile device can determine a route from the user's current location to the particular point of interest.

In block 422, the mobile device can display, to the user, a map that shows at least the user's current location and the route from the user's current location to the selected particular point of interest. Alternatively, the mobile device can send the map to the accessory via a communication path, and the accessory can display the map to the user.

Although certain embodiments of the invention discussed above determine user intent based on a single user request (e.g., for a list of nearby stores of a particular type), alternative embodiments of the invention infer user intent from a set of multiple user inputs. For example, in one embodiment of the invention, the mobile device tracks the destinations that the user has visited. The mobile device, or a service utilized by the mobile device, can then determine attributes that these destinations have in common in order to infer the user intent.

A user intent inferred in this manner can be used to select promotional materials for presentation in association with points of interest as discussed in connection with any of the processes described above. In one embodiment of the invention, the mobile device can use any and all information known about the mobile device's user to understand and infer the user's intent. Such information can include historical data that the mobile device has learned about the user over time. Advertising can be made more direct, in one embodiment of the invention, by the mobile device's use of user's previous requests and behaviors. For example, in response to detecting that a user always takes a particular route to work, and in response to determining that the user purchases gasoline at a determined frequency (which the mobile device can determine using GPS and known gas station coordinates), the mobile device can infer that the user's intent during the user's morning commute is to find a gas station along the user's route that sells gas at a lower cost than other gas stations along that route. An advertisement for such a gas station can be selected for presentation to the user in response to determining that this is the user's intent. For another example, in one embodiment of the invention, the mobile device can use information from a device-resident calendar application to infer the user's intent. In response to detecting that a person's birthday has been entered onto the calendar on a future date within a specified period of time from the present date, the mobile device may infer that the user's intent is to purchase a birthday card or gift. An advertisement for a store that sells birthday cards or gifts can be selected for presentation to the user in response to determining that this is the user's intent. In one embodiment of the invention, the mobile device can infer user intent based at least in part on questions that the user has previously asked the mobile device. For example, the mobile device can infer that the user's intent involves a subject (e.g., a particular historical person) of the question that the user asked to the intelligent assistant in the past, and, in response, can recommend informational materials that are relevant to that subject (e.g., places that are associated with the particular historical person).

Although certain embodiments of the invention discussed above determine user intent based on a point of interest to where the user apparently intends to go, in alternative embodiments of the invention, the user intent is determined based on a user-specified category to which the point of interest belongs. For example, instead of commanding the mobile device to find a list of nearby stores of a particular type (such as pharmacies), the user might command the mobile device to find a list of places at which cough medicine can be purchased. Under such circumstances, the user intent might be determined to be the category "cough medicine" instead of the identity of the particular pharmacy to which the user has requested a route. The specialized service discussed above can decorate list entries, or select additional proximate points of interest, based on the category "cough medicine." Additional points of interest that are mapped to the category, and with which promotional materials are associated, can be selected for display on the map. List entries that specify points of interest that are mapped to the category can be decorated with promotional materials.

In certain embodiments of the invention, user intent determined from one application executing on the mobile device can be shared with other applications that execute on the mobile device, so that those other applications can present promotional or other informational materials to the user based on the user's intent. In some embodiments of the invention, user intent determined by a remote server with which the mobile device communicates can be shared with applications that execute on the mobile device, so that those other applications can present promotional or other informational materials to the user based on the user's intent. In one embodiment of the invention, user intent sharing can be accomplished by the mobile device exposing the determined user intent with an operating system of the mobile device. Applications executing on the mobile device can then access the exposed user intent if useful to those applications. For example, an application that recommends restaurants may access such operating system-exposed user intent data in order to generate a list of recommended restaurants that are relevant to the intent.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for providing information to a user, the method comprising: receiving, at a mobile device, from an accessory that is separate from the mobile device, a selection by a user of a particular entry from a plurality of entries that the mobile device previously sent to the accessory, each of the entries having an associated location and at least one of the entries having been augmented by the mobile device with additional content selected based in part on the associated location for the at least one of the entries; determining user intent data based at least in part on the particular entry; and exposing the user intent data via an operating system of the mobile device to a plurality of applications that execute on the mobile device separately from each other and that use the user intent data to generate, on the mobile device, recommendations for presentation to the user.

2. The method of claim 1, wherein the additional content includes an advertisement.

3. The method of claim 1, wherein the entries are vCards, and where said augmenting comprises inserting said additional content into extended fields of said vCards.

4. The method of claim 1, further comprising:
deriving the user intent data from a destination to which a user has indicated that the user desires to travel.

5. The method of claim 1, wherein the user intent data reflects a category to which the associated locations are mapped.

6. A computer program product comprising a non-transitory computer-readable storage medium encoded with program instructions that, when executed by a processor of a computing device, cause the processor to execute a method comprising: receiving, at the computing device, input from a user of the computing device; in response to receiving the input, selecting, from a plurality of points of interest, and based at least in part on a current location of the computing device, one or more points of interest; for each particular point of interest of the one or more points of interest that is mapped to promotional material, enhancing a vCard for that particular point of interest with information that indicates that promotional material is available for that particular point of interest by inserting information about that promotional information into an extended field of that vCard; providing, to an accessory that is designed to display vCards related to points of interest, a list that contains one or more vCards that have been enhanced to indicate that promotional material is available for entries in the list; receiving, from the accessory, a user selection of a particular vCard that has been enhanced to indicate that promotional material is available for that particular vCard; determining an intent based on the user selection of the particular vCard; and exposing the intent via an operating system of the mobile device to a plurality of applications that execute on the mobile device separately from each other and that use the intent to generate, on the computing device, recommendations for presentation to the user.

7. The computer program product of claim 6, wherein the method further comprises:
   in response to receiving the user selection from the accessory, requesting, from a server over a wireless medium, an advertisement that is mapped to the particular vCard; and
   in response to receiving the advertisement over the wireless medium, providing the advertisement to the accessory.

8. The computer program product of claim 6, wherein the method further comprises:
   displaying a map that shows, for each particular point of interest of the one or more points of interest, a location of that particular point of interest relative to the user;
   wherein the map indicates, for each particular point of interest of the one or more points of interest, that promotional material is available for that particular point of interest;
   determining, based at least in part on historical facts indicating that the user stops at a particular type of store while traveling a particular route during a specified time-of-day range, that the intent involves finding a first store of the particular type along the particular route that sells a type of commodity sold by stores of the particular type for less than other stores of the particular type along the particular route;
   determining, based at least in part on calendar information indicating that a particular type of occasion will occur within a specified interval of time from a present date, that the intent involves finding a second store that sells items of a particular type that are associated with the particular type of occasion; and
   determining, based at least in part on subjects of questions that the user asked an intelligent assistant accessible through the mobile device, that the intent involves finding places that are associated with the subjects of the questions.

9. A method for providing information to a user, the method comprising: receiving, at a mobile device from a vehicular navigation system that is not a part of the mobile device, information identifying a location selected by a user from a plurality of entries that the mobile device previously sent to the vehicular navigation system, each of the entries having an associated location and at least one of the entries having been augmented by the mobile device with additional content selected based in part on the associated location for the at least one of the entries; identifying, by the mobile device, based at least in part on the location selected by the user, an intent of the user; and exposing the intent via an operating system of the mobile device to a plurality of applications that execute on the mobile device separately from each other and that use the intent to generate, on the mobile device, recommendations for presentation to the user.

10. The method of claim 9, further comprising: receiving, at the mobile device, user intent data; generating, by the mobile device, based at least in part on the user intent data, a list containing a plurality of entries, each of the entries having an associated location; and sending, by the mobile device to the vehicular navigation system, the list, wherein the information identifying the location selected by the user is received in response to sending the list.

* * * * *